2,997,283
CONDENSATION OF CONDENSABLE BOUNDARY
LAYER FLUID
Clifford E. Seglem, Wallingford, Pa., assignor to Westinghouse Electric Corporation, East Pittsburgh, Pa., a corporation of Pennsylvania
Filed Jan. 22, 1957, Ser. No. 635,242
2 Claims. (Cl. 261—115)

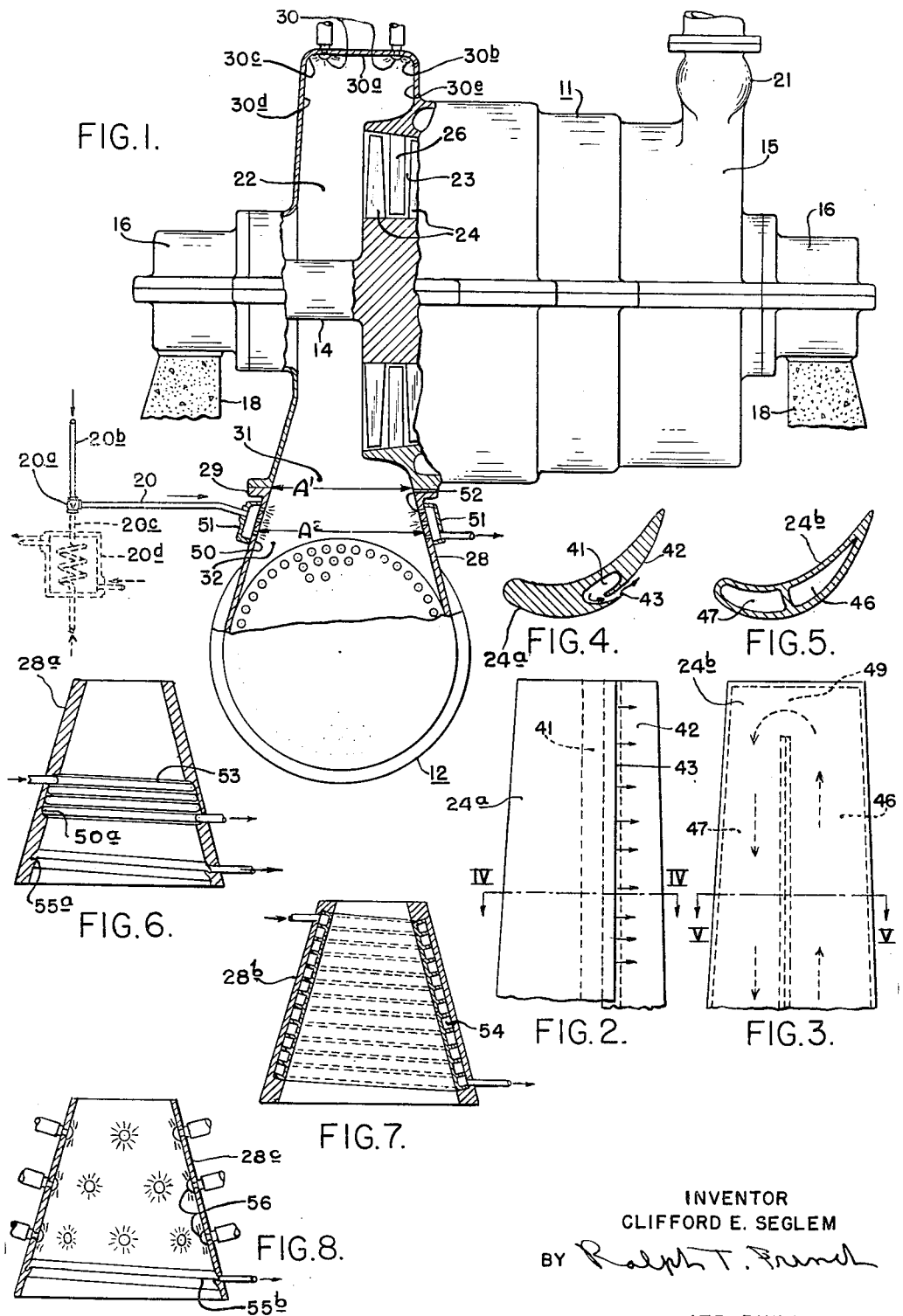

This invention relates to fluid flow apparatus and in particular to the control of the boundary layer of a flowing fluid.

When a fluid flows over a boundary surface a boundary layer of fluid is formed having a velocity materially smaller than the velocity of the main portion of the fluid stream. In effect, a stagnant layer or a layer of fluid at a retarded velocity exists at the boundary which tends to build up in thickness to a critical point, whereupon separation of the fluid from the boundary surface occurs with a resulting disturbance in the flow pattern and interference with the performance of the aerodynamic function of the boundary surface.

As one example, in diffusing flow it has been found that the rate at which the diffuser diverges must be restricted if boundary layer instability is to be avoided. One effect of this is that the diffuser has been made very long.

It is an object of the present invention to provide a diffuser of short axial length, but highly efficient in operation.

Heretofore boundary layer control has been attempted by reactivating or energizing the boundary layer of fluid. Vortex generators have been utilized to reactivate the boundary layer and energization has been accomplished by various means such as blowing fluid out through an opening in the surface, tangentially thereto, so as to add a velocity component in the general direction of the normal movement of the fluid or by sucking in the boundary layer through a hole in the boundary surface.

The purpose of the foregoing methods has been to reduce the magnitude of the fluid losses by preventing or minimizing boundary layer instability and separation. The losses in the fluid stream are manifested by the formation of uncontrolled eddies and vortices which further disturb the main body of flow.

It is a further object of the invention to control the boundary layer so as to minimize eddies and vortices in the fluid and to control those eddies and vortices which may develop by continuously removing the boundary layer.

A further object of the invention is to control the boundary layer by utilizing means capable of easy installation and not requiring a complicated assembly.

This invention provides, in elastic fluid flow apparatus utilizing a fluid which is readily condensed, such as steam, in contrast to some other fluids, such as air, which are not so readily condensed, means for controlling the boundary layer by condensing and then removing the fluid constituting the boundary layer. The condensing means is in heat exchange relation with the boundary layer so that the boundary layer is cooled to the temperature necessary for its condensation. A further means is provided for removal of the condensate from the fluid flow path.

The foregoing and other objects are effected by the invention as will be apparent from the following description taken in connection with the accompanying drawings, forming a part of this application, in which:

FIG. 1 is a side elevation view of a typical turbine embodying the present invention, a portion of the casing thereof being broken away for the sake of clarity;

FIGS. 2 and 3 are enlarged fragmentary views of typical turbine blades embodying the present invention and shown in side elevation;

FIGS. 4 and 5 are cross-sectional views, taken along the lines IV—IV of FIG. 2 and V—V of FIG. 3, respectively, looking in the direction indicated by the arrows; and FIGS. 6, 7 and 8 are cross-sectional views of three typical diffusers, embodying different forms of the present invention.

Referring to the drawing, and in particular to FIG. 1, there is shown a typical elastic fluid turbine 11 employing steam as the working medium and a cooperating condenser 12. The turbine is provided with an axially extending rotor 14 supported at each end by bearings (not shown). The rotor and bearings are enclosed by a turbine casing 15 and bearing housings 16, respectively, the bearing housings being mounted on pedestals 18 which support the turbine.

The turbine is provided with an inlet conduit 21 which supplies steam to a blade path 23 for exhaust through a chamber or annulus 22. The annulus 22 is in communication with the blade path 23, the latter being comprised by a plurality of rotating blades 24 secured to the rotor 14, and a plurality of stationary blades 26 secured to the casing 15. The annulus 22 is in communication with the condenser 12 and provides a passageway for the steam from the blade path 23 to the condenser 12.

The condenser 12 is provided with an annular conduit 28 which is secured to the turbine casing by a flanged connection 29 secured by suitable bolts and nuts (not shown). The conduit 28 is a diffuser; that is, the annular walls are constructed with a taper which diverges gradually from inlet to outlet so that the flow area $A^1$, at the inlet 31 is smaller than the flow area $A^2$ at the outlet 32, the velocity of the steam is greater at the inlet than at the outlet and the pressure is greater at the outlet than at the inlet.

The present invention provides means for the control of the boundary layer which is formed by the working fluid, in the instant case steam, on the turbine blades, both rotating and stationary, on the inner surfaces of the exhaust annulus and on the walls of the diffuser. On each of the foregoing enumerated surfaces a means is provided for supplying a cooling fluid which is in heat exchange relation with that portion of the boundary layer which is to be controlled and is effective to cool the boundary layer to the point of condensation. Suitable means are provided for removal of the condensate when its presence is objectionable.

In FIGS. 2 and 4 there is illustrated an embodiment of the present invention as applied to a turbine blade 24a. Since the critical portion of the boundary layer on a blade is a portion of the convex side 42 adjacent the trailing edge, the present embodiment provides a passage 41 disposed adjacent the aforesaid portion of the blade which is in communication with a source (not shown) of cooling fluid. The passage 41 is in communication with a longitudinally extending aperture 43 constructed to direct a stream of cooling fluid tangentially of the convex surface to be cooled. As the convex surface becomes cooled the boundary layer of steam condenses, forming droplets. Since the presence of water droplets in the working fluid of the turbine may cause blade erosion, means may be provided (not shown) for the removal of these droplets.

Referring to FIGS. 3 and 5 a further embodiment of the present invention as applied to a blade 24b is shown. In this embodiment the blade is constructed with a substantially hollow interior divided into a first longitudinally extending chamber 46 and a second longitudinally extending chamber 47. The first chamber 46 is located in the trailing edge portion of the blade and cooling fluid from an external source (not shown) is supplied to the chamber 46 and flows upwardly, as indicated in the drawing by dotted arrows, toward the tip of the blade where a passage 49 forms a communication between the first chamber 46 and the second chamber 47. The second chamber 47 conducts the cooling fluid back toward the base of the blade. The mode of operation of the present embodiment is similar to that of the previous embodiment. The cool fluid is initially in heat exchange relation with the convex surface of the blade at the trailing edge and is of sufficient coolness to condense the boundary layer of steam on the outer surface of the blade.

Referring to FIG. 1, particularly the annulus 22, it will be seen that a plurality of nozzles 30 have been provided for spraying a cooling fluid into the annulus and may be mounted on the substantially circumferential wall 30a of the casing in a plurality of rows extending circumferentially. Two such circumferential rows are shown in FIG. 1 with one row located adjacent ends 30b and 30c of the wall 30a. The nozzles are so located because the ends 30b and 30c of the exhaust annulus are the most critical portions where separation and unstable flow, producing eddies and vortices, are most likely to occur. This is due to the change in direction of flow and the usually abruptly changing contours where the substantially vertical planar end walls 30d and 30e are joined to the substantially circumferential wall 30a. The nozzles are so constructed and disposed in relation to the boundary layer that they spray a stream of cool fluid onto the boundary layer to be controlled. The cooling fluid is at a temperature such that the boundary layer to be controlled will be condensed. More particularly, the nozzles 30 are of the wide angle spray type from which the cooling fluid is sprayed radially in a flat spray pattern. The number of spray nozzles 30 employed is not critical. However, for optimum condensation of the boundary layer, they are preferably so grouped and spaced that their individual spray patterns interlace and closely blanket the circumferential walls 30a. Additional nozzles may be provided to spray cooling fluid into the eddies and vortices which may form due to other reasons than boundary layer separation. The stream sprayed into the eddies and vortices also serves to condense the steam making up the eddies and vortices. As hereinbefore stated, means may be provided for removal of the condensate.

Referring to the FIG. 1 again, and particularly the diffuser conduit 28 connecting the condenser to the turbine, it will be seen that an annular jacket 51 encompassing the outer wall of the diffuser has been provided. The axial location of the jacket 51 along the diffuser wall depends upon the angle of divergence of the diffuser, the ratio of inlet flow area $A^1$ to outlet flow area $A^2$ and upon boundary layer conditions determined experimentally. Usually instability of the boundary layer occurs along the diffuser portion 50 nearest the outlet and $A^2$ and it will usually be sufficient to provide a jacket over this portion only. But where flow conditions and the divergence angle of the diffuser require it, the jacket may extend along the entire axial length of the diffuser.

The purpose and operation of the jacket 51 is similar to that of the previously described embodiments. A cooling fluid is circulated, as indicated by the arrows, in the jacket 51 which is at the proper conditions for condensation of the boundary layer to be controlled. If desired the inner wall of the diffuser may be provided with nozzles 52 in communication with the fluid circulating in the jacket for the purpose of spraying the cooling fluid into the boundary layer so as to further aid in the cooling thereof.

Referring to FIGS. 6, 7 and 8, further embodiments of the present invention are shown as applied to diffusers 28a, 28b and 28c, respectively. In FIG. 6, coils 53 are attached annularly to the inner wall of the diffuser 28a, in the area which has been previously determined to be the one in which separation occurs, for the circulation, as indicated by the arrows, therein of a cooling fluid. If desired, the condensate may be removed by an annular trough 55 which discharges to suitable means.

Referring to FIG. 1, the jacket 51 is supplied with cooling fluid by a conduit 20 which is in communication at one end with the interior of the jacket 51 and at the other end with a suitable valve 20a. The valve 20a, as desired, provides a communication between the conduit 20 which is connected to a source 20b of condenser cooling water or a second source 20c of water which has been cooled to the temperature necessary by a heat exchanger 20d.

In FIG. 7 the inner wall of the diffuser 28b is divided into annular passages 54 for the flow therethrough, as indicated by the arrows, of a cooling fluid. In FIG. 8 only wide angle spray nozzles 56, secured to the diffuser 28c, are utilized for spraying a cooling fluid onto the boundary layer. As in FIG. 6, an annular trough 55 may be provided for removing the condensate.

The cooling fluid which is circulated through the various embodiments previously described may be condenser cooling water or water which has been passed through a heat exchanger to attain the desired temperature.

By condensing the boundary layer on the diffuser, before it has the opportunity to build up to excessive thickness, the effective flow area of the diffuser is increased. For equal flow areas, therefore, a diffuser employing boundary layer condensation according to the present invention may be constructed having a smaller flow area, thereby resulting in a smaller diffuser. In addition, since the diffuser need no longer be made having a limited angle of divergence in order to prevent boundary layer instability, the diffuser may now be constructed of shorter axial length for the same pressure and velocity changes which heretofore required very long diffusers.

The boundary layer forms continuously on the boundary surface as long as the steam is flowing over the boundary surface. Consequently, the condensing process must also be a continuous one and if the presence of condensate is objectionable, then provision for condensate removal must be continuous also.

The present invention contemplates the use of a working fluid, such as steam, in the turbine 11 which is readily condensed, in contrast to a fluid, such as air, which is not so readily condensed. Theoretically, the present invention may be practiced using any fluid as the working medium for the turbine since, under proper conditions of temperature and pressure, fluids are condensible. In practice, it will be found expedient to limit the control of the boundary layer to condensible elastic fluids, which are those fluids, sometimes referred to as vapors, having saturated properties allowing condensation to occur on a surface that need not be cooled to a temperature lower than that provided in the ambient heat sinks of nature, such as rivers, lakes, oceans, and the atmosphere and in the appended claims the words "condensible elastic fluid" define a fluid having the foregoing property. Those elastic fluids having condensation temperatures higher than those natural lower limits do not present any theoretical problem but the necessary mechanical complications of obtaining the proper conditions for condensation make it impractical for commercial installations. The vapors of water, mercury and some hydrocarbons, such as liquid petroleum, are representative of condensible elastic fluids in contrast to a fluid, such as air, which is not readily condensed.

While the invention has been shown in several forms, it will be obvious to those skilled in the art that it is not so limited, but is susceptible of various other changes and modifications without departing from the spirit thereof.

What is claimed is:

1. In a turbine utilizing a motive condensible heated vapor, the combination of wall structure defining an exhaust chamber for the flow therethrough of said vapor, said wall structure having a surface portion, said surface portion having a relatively slower moving boundary layer of said vapor formed thereon, a plurality of wide angle spray nozzles for spraying a coolant fluid at a sufficiently low temperature to condense said vapor, said nozzles being arranged to spray said coolant fluid into said chamber in close proximity with said surface portion and in heat exchange relation with said boundary layer.

2. In a turbine utilizing steam as the motive medium, the combination of wall structure defining an exhaust chamber for the flow therethrough of said steam, said wall structure having a surface portion, said surface portion having a relatively slower moving boundary layer of said steam formed thereon, and a plurality of wide angle spray nozzles for spraying coolant water at a sufficiently low temperature to condense said steam, said nozzles being arranged to spray said coolant water in a flat interlacing spray pattern into said chamber in close proximity with said surface portion and in heat exchange relation with said boundary layer.

References Cited in the file of this patent

UNITED STATES PATENTS

| | | |
|---|---|---|
| 873,041 | Gray | Dec. 10, 1907 |
| 984,435 | Leblanc | Feb. 14, 1911 |
| 1,352,438 | Ehrhart | Sept. 14, 1920 |
| 2,312,113 | McNulty | Feb. 23, 1943 |
| 2,641,440 | Williams | June 9, 1953 |
| 2,663,547 | Evans et al. | Dec. 22, 1953 |
| 2,708,564 | Erickson | May 17, 1955 |

FOREIGN PATENTS

| | | |
|---|---|---|
| 212,259 | Great Britain | 1925 |
| 97,933 | Switzerland | Feb. 16, 1923 |
| 473,974 | Italy | Aug. 22, 1952 |